Oct. 25, 1960  W. J. DE VILLIERS ET AL  2,958,025
PROPULSION OF BODIES SUCH AS PROJECTILES
RECIPROCATING MEMBERS AND THE LIKE
Filed Dec. 11, 1956  6 Sheets-Sheet 1

W. J. DE VILLIERS ET AL 2,958,025

PROPULSION OF BODIES SUCH AS PROJECTILES
RECIPROCATING MEMBERS AND THE LIKE

Filed Dec. 11, 1956

United States Patent Office 2,958,025
Patented Oct. 25, 1960

2,958,025

PROPULSION OF BODIES SUCH AS PROJECTILES, RECIPROCATING MEMBERS AND THE LIKE

Willem J. de Villiers and Denis Bruckmann, both of Kitwe, Northern Rhodesia, Central African Federation Filed Dec. 11, 1956, Ser. No. 627,672

10 Claims. (Cl. 318—135)

This invention relates to the propulsion of bodies. Such bodies may be projectiles, reciprocating rods and the like.

An object of the invention is to provide electromagnetic means for the propulsion of bodies.

A method of propelling a body (consisting in or including a mass of magnetic material) along a prescribed path comprises causing a magnetic force so to act on the mass as to induce a change in its state of rest, or of movement along the path, removing the magnetic force while the body is still in motion and causing or allowing the body to continue movement after removal of the force. In order to obtain the maximum results, the force is removed when or before the body reaches the point of maximum flux density along the path.

The invention further provides that after removal of the first magnetic force the body is caused to continue its movement by causing a second force to act on the body in the manner described. Further movement may be obtained by employing any number of forces in succession each force having its point of maximum flux density at a point along the path which is in advance of that of the previous force.

Reciprocation of the body along the path may be obtained by reversing the order in which the forces are applied to the mass after the body has reached the end of a stroke.

Conveniently the magnetic force is created by passing an electrical current through a solenoid which preferably surrounds part of the prescribed path. The current density is arranged with reference to all conditions such as the mass of the body, the acceleration or sustaining force required and the space available.

Apparatus for propelling a body of the kind specified along a prescribed path, therefore, comprises means, such as a solenoid, for creating a temporary magnetic force and means such as a switch mechanism to remove the magnetic force while the body is in motion and preferably includes further means to apply further magnetic forces to the body while it is moving.

Thus the invention provides that the apparatus includes a series of solenoids (preferably of the same size and rating) arranged side by side with their cores surrounding the prescribed path which will generally be a straight path.

In the latter case the shape and size of the magnetic mass is of importance. Preferably the mass has a main portion, of uniform maximum cross-sectional area and of a sufficient length to fill the core of a solenoid, and a leading end, or two ends (in the case of reciprocating motion), which is or are formed of a taper section so that by means of the continual increase of area of the cross-section after the core has been bridged the mass continues to have thrust in the forward direction. By this means the leading end of the mass is extended into the influence of the following solenoid and thus enables a thrust to continue acting on the mass indefinitely as far as magnetic circuits extend.

For increased magnetic efficiency each solenoid is provided with pole pieces of magnetic material at its ends. Bearings may be provided at the poles to support the body.

The body itself is generally of rod-shape and made up of a magnetic mass or armature and nonmagnetic portions. Conveniently the latter have conical spigots engaging in complementary sockets in the armature, the distance between the floors of the sockets being the length required to bridge the core of a solenoid.

The overall length of the armature is critical and should be between $1.5D+K$ and $2D+K$ where D is the distance between pole pieces and K is a design constant derived from the formula for magnetic force, $$F = K.dA/dL$$

where A is the cross-sectional area, L is the stroke, F the force and K the constant of design.

The invention further provides a control circuit for pulse switching from one solenoid to the next. The most convenient form comprises grid-controlled mercury-arc rectifiers controlled by an electronic sequence timer. The solenoids may be pulsed in sequence in a predetermined fashion thus providing a ripple of energy in a given direction which the armature will follow. Alternatively the position of the armature may be determined by any form of position detector and switching controlled by feedback.

In order to achieve high power and velocity, especially in applications where the accumulated kinetic energy or momentum of the armature is the prime requisite, very large current densities in excess of 40,000 amps. per square inch may be used if proper control of switching and repetition rate is maintained.

The invention is further discussed below with reference to the accompanying drawings, in which—

Figure 8 is a circuit diagram of an ancillary circuit.

Figure 1:
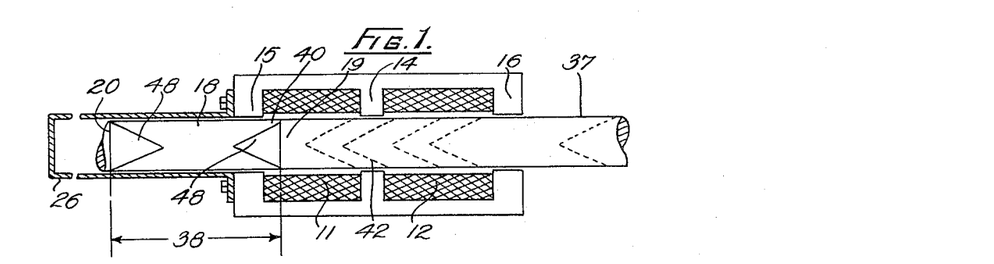
Figure 1 is a diagrammatic section through apparatus according to the invention.

The machine illustrated in Figure 1 and the associated circuits have been designed primarily for the purposes of tuyere punching in a converter. With suitable modifications the machine could be used for a large number of purposes. In the following description the machine of Figure 1 will be discussed primarily with reference to tuyere punching.

Basically the machine consists in two iron-clad coils 11 and 12 having end pole pieces 15 and 16 and a centre pole piece 14. A plunger 37 is arranged for reciprocation through the bore defined by the coils and pole pieces. The plunger comprises armature 18 and two non-magnetic sections 19 and 20. The armature 18 is formed with two conical indentations at its ends to provide the taper portions mentioned above.

As shown the armature 18 is at its starting position for performing a tuyere punching stroke. The dotted line positions are positions relatively to the other pole pieces 14 and 16 of the leading end 40 of the armature 18.

The first point to be noted in connection with the magnetic circuit is that the length 38 of the armature 18 is between $1.5\,D+K$ and $2D+K$ where D is the distance between the centres of the pole pieces 15 and 14 and K is a design constant. The distance between the centres of the pole pieces 14 and 16 is larger than D for reasons indicated below, but in this case also the equation should be satisfied. Thus, with the same constant K and $Dl$ the distance between the centres of the poles 14 and 16 the length of the armature is between $1.5Dl+K$ and $2Dl+K$.

Figure 2:
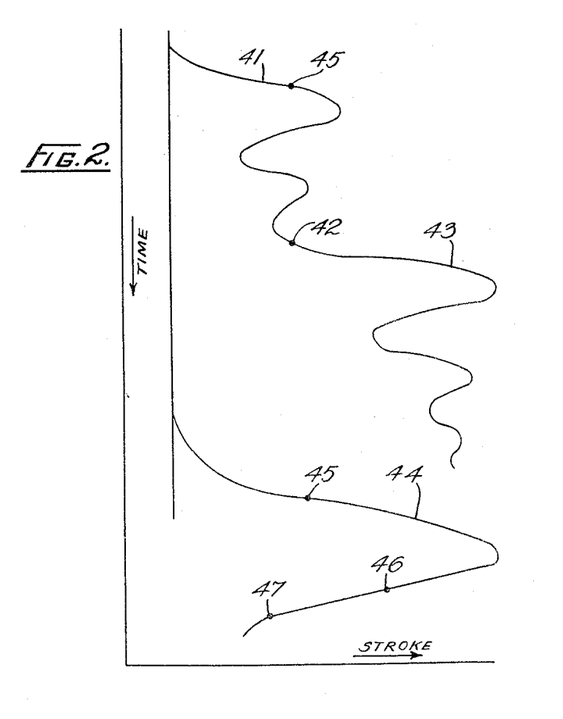
Figure 2 is a graph showing the performance of the machine of Figure 1.

Assuming that current be applied to the coil 11 then movement of the leading end 40 of the armature 18 in relation to time is shown in the graph 41 plotted in Figure 2. At about the point 42 (corresponding to dotted line position 42 in Figure 1) the armature will come to rest. If now the coil 11 is de-energised and the coil 12 fed with current, the curve 43 represents further movement of the armature 18. The punching stroke is achieved by a combination of the curves 41 and 43 to the form shown in the curve 44, i.e. an almost sinusoidal stroke may be achieved. The stroke shown in curve 44 is attained by switching off the current in coil 11 when the leading end 40 has passed the pole piece 14 (e.g. at point 45) and applying current to the coil 12. The amplitude of the oscillation will be larger than for coil 11 because the armature possesses the combined kinetic energies imparted by the two coils. If at point 46, the coil 12 be switched off and the coil 11 energised, the armature 18 will again be acted upon by coil 11 and be withdrawn towards its starting position. If current be then switched off at point 47 the plunger 37 moves until its movement is arrested by the cover 26.

The length of the working stroke has been found to depend on the starting point, the distance between pole pieces, the overshoot of the plunger and the timing of the switching.

In practice the switching will be determined by the dynamic response of the machine. The overshoot has been found to depend on the depth of the conical indentations 48 and the starting point may be chosen at will within limits. Thus the stroke of the machine is largely a question of geometry.

The actual length of the coils is determined by the current loading and the desired length of the power stroke. The maximum displacement being dependent only on the length of the armature, the depth of the cone and the starting point, the percentage of the total stroke under power depends on the length of the coil 12. To ensure that at least 75 percent of the plunger stroke is under power the coil 12 has been increased in length relatively to the coil 11 by about one third.

Any suitable form of switching may be used, but there are several important factors that have to be taken into consideration. Firstly the current pulses applied to the coils must be very accurately controlled. Secondly due to space limitations the coils are relatively small and extremely large current densities (of the order of 1500 amps. per square centimetre) are involved. The basic switching problem is then to handle large power pulses for very short but well-defined periods and to ensure that the loading on any one coil is not repeated too often.

By using grid-controlled mercury arc rectifiers the switching problems are simplified to a large extent. The rectifiers serve the functions of converters and contactors. As said above, the use of direct current is preferred for the reason that suitable magnetic materials for the use of alternating current are not easily available.

Figure 3:
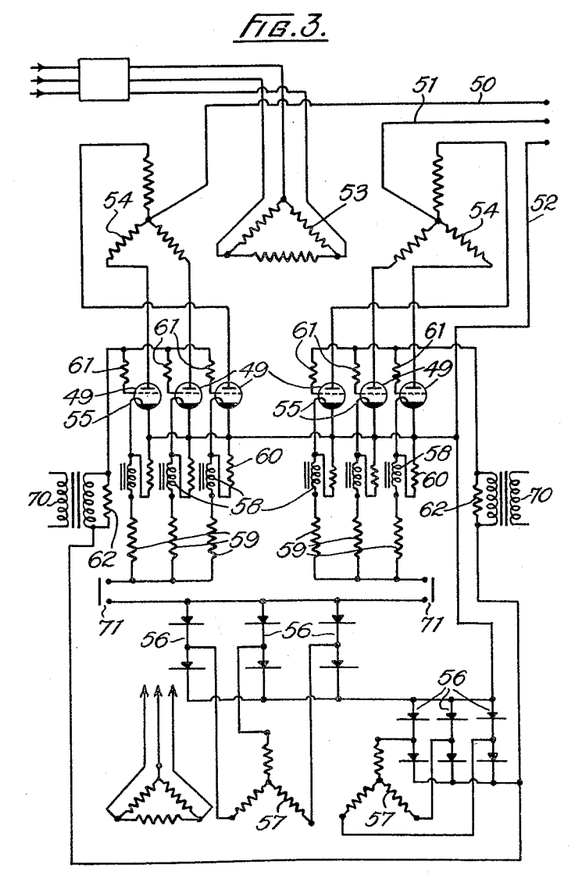
Figure 3 is a diagram showing a suitable power supply.

Figure 3 shows a circuit which was devised to use mercury arc rectifiers of the kind made by the English Electric Company and known as excitrons. In this circuit six excitrons 49 have been arranged in sets of three, each set feeding a supply line 50 or 51 and the sets having a common return 52 in a well known manner. Briefly all the cathodes of the excitrons 50 are connected to the common return 52. The anodes in a set are connected to a secondary 54 of a double wound three phase transformer 53.

In addition to grid control the excitrons have dipping anodes 55 for striking the arcs. Both grid and excitation voltages are provided by separate rectifiers 56 from transformer secondaries 57. The dipping anodes 55 are extracted by excitation chokes 58. Resistances 59 are on-load current limiting resistances and 60 are stabilising resistances. Grid limiting resistances 61 and loading resistances 62 for pulse transformers 70 are also provided.

The excitation current is interrupted by contacts 71 in a manner to be described later on.

The arrangement is such that the grids of the excitrons are normally sufficiently biased to prevent the tubes from firing even if the dipping anodes are extracted. The transformers 70 are arranged to provide triggering pulses (by means to be discussed later on) synchronised with the main supply and phased to trigger the excitrons off as the voltage on their anodes rises in the positive direction.

Figure 4:
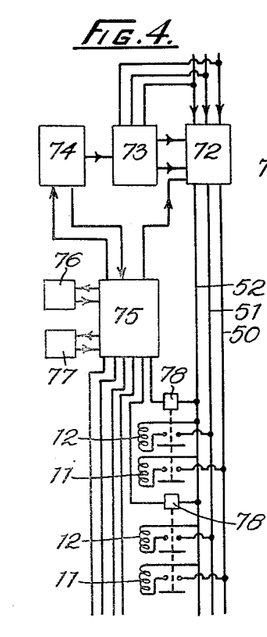
Figure 4 is a block diagram showing various electrical circuits in an operating machine.

The overall circuit arrangement is shown in Figure 4 where 72 represents the power circuit such as that discussed with reference to Figure 3, 73 represents the pulse generator for providing incipient triggering pulses, 74 represents a timing circuit, 75, a distribution control circuit, and 76 and 77 ancillary circuits. In this scheme the circuit 73 continuously produces incipient trigger pulses synchronised to the main supply. The timing circuit 74 is arranged to provide gating pulses to the circuit 73 to allow only some of the incipient trigger pulses to pass and become trigger pulses which actuate the excitrons in the circuit 72. The timing circuit is also interlocked with a distribution circuit 75, so that gating pulses are only generated when the distribution circuit is in order and so that the distribtuion connections are made relatively in phase with the gating pulses. The circuit 76 is arranged to act manually or automatically to allow the distribution circuits to operate as and when punching strokes are desired or required. The circuit 77 is arranged to interrupt the distribution circuit when certain predetermined outside conditions are not satisfied or when manually operated for maintenance or other purposes. The circuit 75 also includes a relay which is adapted to close the contacts 71 in the circuit 72.

If the frequency of the main alternating current supply is at fifty cycles, the frequency of the trigger pulses from the circuit 73 must be at 150 cycles per second. The gating pulses are conveniently of such a nature that the line 50 carries power pulses suitable to energise the coils 11 of a series (say fifty) of punching machines. The line 51 carries the pulses necessary to work the coils 12 of the series. The sequence is then a pulse on line 50 to start an armature 18 moving, a pulse on line 51 to continue such movement and return the armature towards the first coil and finally a pulse on line 50 to move the armature back to its starting position. While the circuit 75 switches over to the next punching machine there is an interval during which neither line 50 or 51 carries any pulses. At the end of a salvo, i.e. when all the machines in a series have been operated to punch, there may be a predetermined delay or the circuit 76 could take over. It is, however, essential that the three power pulses must follow each other in sequence to ensure that a punch rod returns to its starting position and the circuit 77 is therefore so arranged that it can only interrupt a salvo at the end of a set of three power pulses to the same machine.

The circuit 75 operates power contactors 78 which close the circuits to the solenoids 11 and 12 just before a set of power pulses is due to arrive and open them just after such power pulses have terminated.

Figure 5:
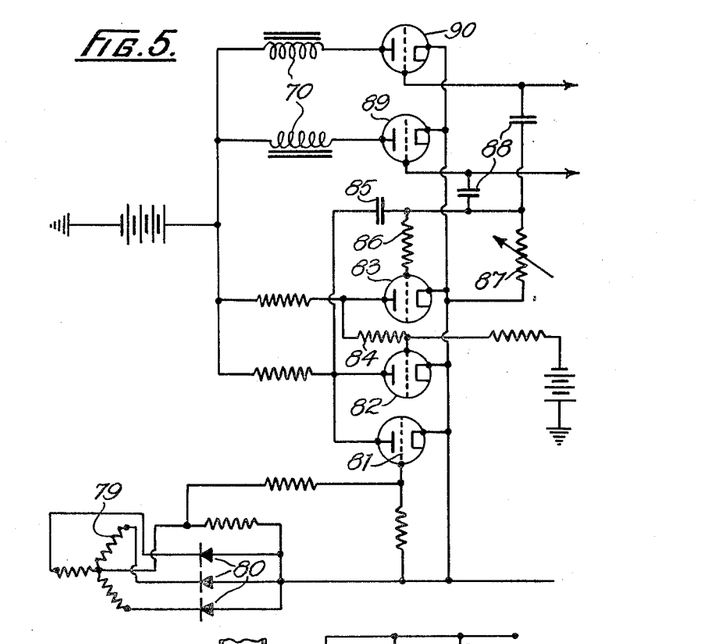
Figure 5 is a circuit diagram of an arrangement for generating triggering pulses for the power circuit.

Numerous detailed circuit arrangements are possible to achieve the general conditions outlined above. Figure 5 illustrates a circuit suitable for generating the incipient trigger pulses. A separate three phase secondary winding 79 is wound on one of the excitation transformers 57 (Figure 3) and feeds a bank of star connected germanium diodes 80. The ripple voltage superimposed upon the rectified voltage is applied inverted to the grid of a triode 81 which modulates a unistable flip-flop circuit comprising triodes 82 and 83. This circuit is adjusted to pass square wave of a time duration depending on the value of the grid resistance 84. The 150 cycles per second ripple voltage locks the flip flop to the third harmonic of the mains frequency.

The resultant square wave pulse is differentiated in the circuit including condenser 85 and resistance 86, so that its trailing edge develops a positive going pip, the phase of which in relation to the ripple pulse is controlled by a variable resistance 87. These positive going incipient trigger pulses are applied through condensers 88 to the grids of a pair of power amplifiers 89 and 90 the bias voltage of which is such that they will not normally conduct even in the presence of the incipient trigger pulses. If the bias is reduced by, say fifty volts, the tubes 89 and 90 will conduct for the period of each incipient trigger pulse. The bias is controlled by gating pulses from the timing circuit to be described later on.

The outputs of the amplifiers 89 and 90 are fed to the transformers 70 described with reference to Figure 3.

Figure 6:
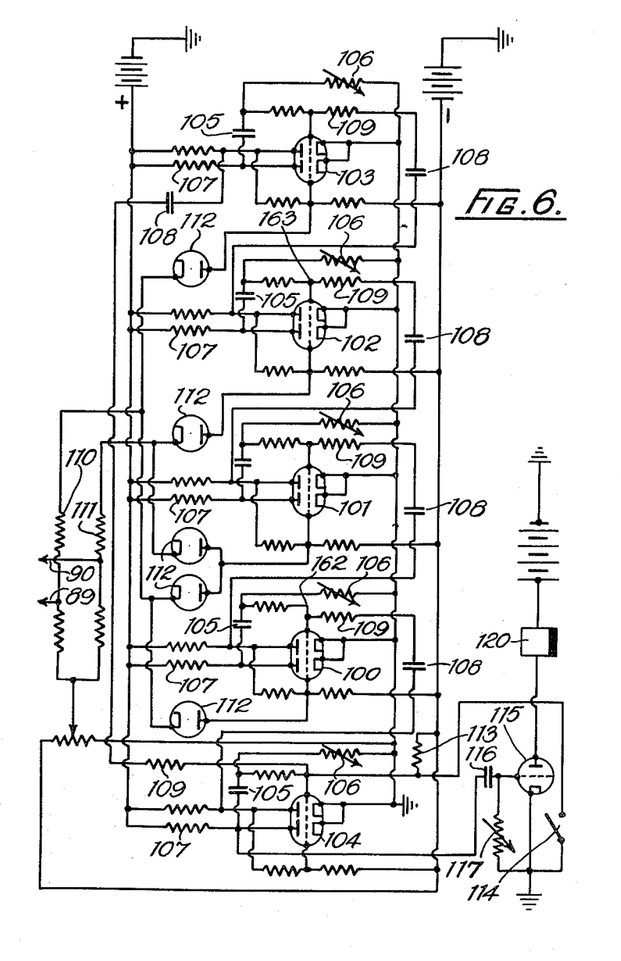
Figure 6 is a circuit diagram of the master timer circuit.

A suitable timing circuit for deriving gating pulses is illustrated in Figure 6. This circuit is well known in the art and fundamentally consists in what are known as univibrator circuits. The circuit therefore includes pairs of triodes, the pairs being numbered 100 to 104. The members of each pair are so interconnected that they provide a unistable circuit. Normally, i.e. in the stable state, the one tube conducts and the other does not. When a negative going signal is applied to the grid of the conducting tube (the right hand one in the drawings) its anode potential will rise thus progressively reducing the bias of the second or left hand tube until the bias exceeds the cut-off potential of the second tube. If the input signal is sufficiently large in amplitude the second tube begins to conduct. This results in a violent feed back between the tubes causing the grid of the first tube to be depressed to the full of the change of voltage on the condenser 105 between the anode of the first tube and the grid of the second tube, thus cutting off the first tube and attempting to raise the potential of the second tube. The pair remains in this condition until the charge on the condenser 105 gradually leaks away through a variable resistance 106 and a resistance 107. As soon as the potential of the first tube passes the cut off point violent feed back against results and rapidly restores the circuit to the normal stable state.

The period of the quasi-stable state depends on the supply voltage, the load resistance of the tubes and the coupling time constant of the condenser 105 and the resistances 106 and 107.

As shown the anode of the first tube in a pair is connected to the grid of the first tube of the next pair of the five pairs via a small capacitance 108 and a large resistance 109 for the next pair to trigger into the unstable state as soon as the former pair returns to the stable state. In this way the pair 100 triggers the pair 101 and so on to the fifth stage 104 which in turn starts the cycle. It should be noted that the values of the various resistances are so chosen that a stage cannot trigger any stage beyond the next stage.

The grid voltage of the left hand tube of each of the stages 100 and 103 is applied to a potential divider 110 which feeds the grid of the power amplifier 89 (see Figure 5) with the result that only if the stages 100 and 103 are in the unstable state, the tube 89 allows current to pass through its transformer 70. Likewise the grids of the left hand tubes of the stages 101 and 102 are connected to a potential divider 111 which feeds the tube 90.

Diodes 112 are provided to prevent paralleling of the grid circuits of the timing circuits.

The output from stage 103 is fed to stage 104 which is the interval timing stage. The latter is arranged from a much longer quasi-stable state to provide the time interval for switching from one punching machine on to the next. The right hand grid of stage 104 is also permanently connected to a negative supply potential through a resistance 113 and to earth through a pair of contacts 114. The latter form part of the interlock with the distribution circuit discussed below. It should at this stage be noted that if the contacts 114 are bridged, the stage 104 operates in the normal way. With the earth point removed this stage is held in the unstable state. By operating the contacts 114 gating pulses may be initiated or stopped at will but only in complete batches.

Stage 104 also feeds into a further stage consisting of a single valve 115 which works in tandem with it. The valve 115 cuts off with the second valve of stage 104 to de-energise a relay 120 in the distribution circuit. As soon as the time delay involved in the circuit including a condenser 116 and a variable resistance 117 allows, the relay 120 is re-energised.

Depending on the number and time interval of the individual timing stages in the circuit, so a wide variety of output pulses may be applied to the power amplifiers 89 and 90. It has been found in practice that good punching results are obtained by arranging stage 100 to gate five trigger pulses, stage 101 one such pulse, stage 102 eleven pulses and stage 104 five pulses. The fifth stage is arranged to give a delay to suit the reaction time of the distribution circuits. In each situation it is best to determine the correct timing by experiment.

The time delay of branch stage 115 is conveniently arranged to be about fifty milliseconds.

As said above the distribution circuit (Figure 7) includes the relay 120. This relay when energised closes pairs of contacts 121 and 123 and opens contacts 122. A second relay 124 closes three pairs of contacts 125, 126 and 127 and the pair 114 discussed with reference to the timing circuit. There is also a third relay 128 which closes a pair of contacts 130 a pair of contacts 138 and moves a contactor arm 131 from the position shown to a position where it puts a selector 132 in circuit.

Figure 7:
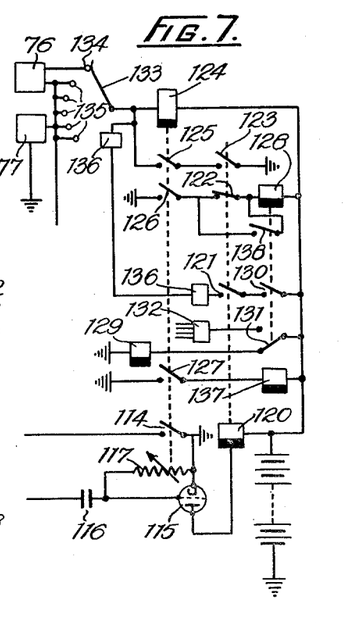
Figure 7 is a circuit diagram of the distribution circuit.

The relay 124 is connected to a uniselector the arm 133 of which sweeps across a bank of contacts 134 (the first one) and 135 of which there are as many as there are punching machines. The uniselector 133 and the selector 132 if it is of the traction type are driven by magnets 136. The contact 127 is in circuit with a relay 137 which closes the contacts 71 referred to with reference to Figure 3.

The circuit 76 includes means to complete it for the purpose of initiating a salvo or a train of salvos. The circuit 77 includes various means for interrupting a salvo or a train of salvos.

Starting from the position where the selector arm 133 contacts the contact 134, if the circuits 76 and 77 are completed, the relay 124 is energised by being connected to earth. This relay then locks itself to earth by means of the contacts 125 (which it closes) and the contacts 123 which are normally held closed by the relay 120. At the same time the contacts 114 are closed to initiate the timing circuit to start a train of power pulses. The relay 124 also closes the contacts 127 which by means of the relay 137 close the excitation contacts 71. The other contacts 126 governed by the relay 124 are also closed but the relay 128 remains de-energised as the relay 120 holds the contacts 122 open.

As the first timing cycle is completed, the relay 120 is momentarily de-energised and the contacts 122 close to energise the relays 128 so that the arm 131 moves to connect the selector 132 in circuit, the contact 130 is closed in the circuit of the magnet 136 of the selectors 133 and 132 and the contacts 138 are bridged to bypass the contacts 122.

If the circuit 77 remains complete, the relay 124 remains closed and a second cycle begins. In this cycle the selector 132 actuates a line contactor 78 (Figure 4) to connect the coils 11 and 12 of the first punching machine to the power supply lines 50 and 51. At the end of the cycle the relay 120 on being momentarily de-energised again causes the relay 128 to close and step on the selectors. If the contact 135 in question is still connected to earth via the circuit 77 the next cycle proceeds and so on until all the contacts 135 in the bank have been wiped by the arm 133. The latter now again proceeds to the contact 134 and if the circuit 76 is now open the relay 124 which has no earth connection when the relay 120 is momentarily de-energised, drops out and punching stops until such time as the circui 76 is again completed. If for any reason the circuit 77 is interrupted at any time during a salvo, the relay 124 will act in the same way, but only at the end of a cycle.

The contactor arm 131 is initially connected to a relay 129 which when energised actuates a contactor to connect a dummy load across the lines 50, 51 and 52. Thus whenever the relay 124 has dropped out, at the end of a salvo or as a result of an interruption of a salvo, the dummy load is first connected to the power supply before punching machines are connected in circuit. The arms 133 and 131 are prevented from moving as the relay 128 is not energised. Thus the excitrons 49 have time to settle down before being called upon to operate a punching machine. After the first power pulses, the relay 120 is momentarily de-energised and the relay 128 comes into operation and remains energised as long as the relay 124 is energised. The selectors 133 and 132 are stepped on by opening and closing the contacts 121.

In order to ensure that the line contactors do not open before the heavy current impulses to the punching machine coils have terminated, the contacts of the relay 120 are arranged to have a ten millisecond delay on opening.

The circuit 77 includes various means for stopping punching operations. Thus there may be manual switches at the main control room and at strategic points at the punching site. Furthermore where air pressure drops below a predetermined minimum it is desirable to stop punching altogether. For this purpose a pressure switch operating on this low pressure is included in the circuit. As it is also undesirable, in the case of a rotary converter to punch during tilting, the circuit also includes a mercury tilt switch on the converter as well as a limit switch on the tilting motor brake arranged to open while the motor is in motion. Any of these switches will immediately stop the next punching cycle and a salvo will be completed only if the stop circuit 77 is again completed.

Figure 9:
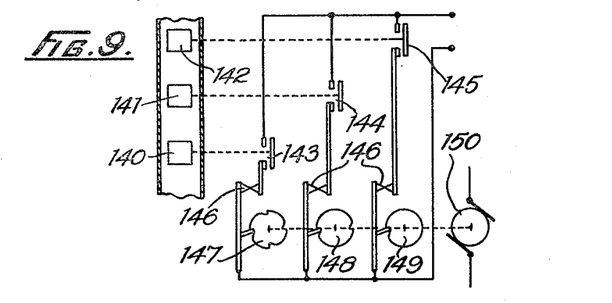

For initiating a salvo a timing clock may be arranged to operate the circuit 76. A suitable arrangement is shown in Figure 9. In this case salvo frequency is determined by overall air flow to the tuyeres. Differential pressure switches 140, 141 and 142 are arranged to be responsive to different minimum volumes of air flow and on such minimum flow being reached each allows a pair of contacts 143, 144 and 145 respectively, to close. The switch 140 is responsive to a predetermined low air flow, switch 141 to an intermediate and the switch 145 to a relatively high flow of air. The contacts 143, 144 and 145 are included in parallel circuits which also include spring contacts 146 which are held open by cams 147, 148 and 149. The cams have notches to allow closing of the contacts 146 depending on the speed at which the cams are rotated by the motor 150 of a timing clock. If the switch 140 allows the contacts 143 to close, the overall initiating circuit by means of the cam 147 with four notches will be closed four times per revolution of the motor 150. The switch 141 and the cam 148 closes the circuit twice and the switch 142 and the cam 149 once only.

Thus the cams in sequence initiate a lesser number of cycles per revolution of the motor 150 until at a predetermined maximum flow the punching machines remain inoperative.

Figure 8:
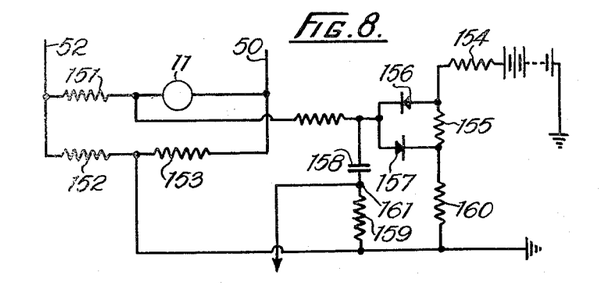
Figure 8 is a circuit diagram of an additional circuit.

It has been found that there is a dip in the back E.M.F. developed by the coils 11 and 12 as they are straddled by the armature 18. This fact may be utilised for automatically switching the coils. A suitable circuit is illustrated in Figure 8. In this case the coil (say 11) is connected to the power supply lines 50 and 52 through a resistance 151. Two further resistances 152 and 153 are connected between the lines in series with one another and in parallel with resistances 11 and 151. The ratio of the resistance of the coil 11 to the resistance 151 is the same as that of the resistance 152. The centre point between the resistances 11 and 151 is connected to coincidence differential circuit comprising a high tension supply, a limiting resistance 154, a resistance 155 across which the volt drop is the co-incidence circuit differential, two rectifiers 156 and 157, a condenser 158 and two further resistances 159 and 160. The centre point of the resistances 152 and 153 is connected to earth as shown. Normally the point 161 is at zero potential. When a change of back E.M.F. of a predetermined magnitude takes place a pulse having the voltage of the co-incident circuit differential is formed at 161. This pulse may be injected to point 162 in Figure 6 in order to step the timing sequence on. If this circuit is used the timing circuits are set at longer intervals than usual, but these would be automatically shortened by the back E.M.F. characteristic. A similar circuit could be used for coil 12 and the resulting pulse injected at a point such as 163. In this case the timing circuit of the pair of triodes 101 must gate that portion of the pulse which performs the forward stroke in coil 12 and the timing circuit of the pair of triodes 102 must control the return stroke.

By using the circuits of Figure 9 the velocity of the plunger 37 is maintained at a maximum level. Furthermore if an encrustation is encountered in a tuyere pipe the machine automatically adjusts its stroke to suit the free length of the tuyere pipe. In other words the machine automatically assesses the conditions encountered by the plunger 37 and adjusts the power pulses accordingly.

Instead of the timing circuit shown in Figure 7, a circuit employing dekatron tubes may be used. In this case the pips developed in the circuit of Figure 6 are fed to the grids of the dekatron tubes and required groups of dekatron cathodes are connected to the grids of the power amplifiers 89 and 90. Dekatron tubes may also be used as the selector 132 (Figure 8) and in this case the power to the line contactors 78 is supplied by thyratron tubes the grids of which are connected to the dekatron cathodes.

The punching machine described gives satisfactory service under most difficult conditions. A stroke as long as 12.5 inches has been maintained with the machine.

The device thus far described with reference to Figures 1 to 9 is very suitable for applications such as tuyere punching where a machine of small bulk is required as a kinetic thrustor. The invention has, however, got many other applications some of which will be discussed below.

Figures 10, 11, 12:
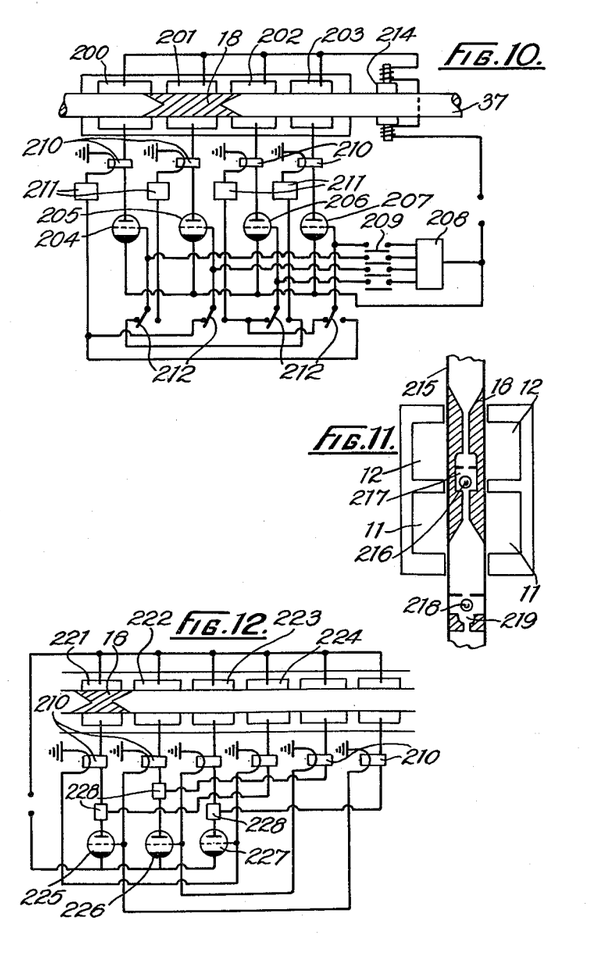
Figure 10 is a diagrammatic view of a positive displacement device.
Figure 11 is a diagrammatic section through apparatus according to the invention which has been constructed as a pump for handling corrosive liquids.
Figure 12 is a diagrammatic view of a device for projecting projectiles.

The machine which is diagrammatically illustrated in Figure 10 is intended for use as a control motor which could, for example, be used to convert a motor water resistance on an alternating current hoist for automatic dynamic braking. The requirements of such a control motor are high acceleration for short stroke increments, a relatively long stroke, instant reversibility, high static resistance.

Figure 10 shows a machine according to the invention which is designed to meet the case. There are four coils 200, 201, 202 and 203 which are operated from a single phase alternating current supply through four excitrons 204, 205, 206 and 207. A series brake 214 serves to hold the plunger 37 in any given position should operations require to be suspended.

As shown the armature 18 straddles coil 201. If coil 202 is energised, the plunger will move right and if coil 200 is energised, it will move left. The maximum power stroke is from the middle of coil 200 to the middle of coil 203.

If the excitrons are all fired simultaneously from a trigger device 208 by closing the contact arms 209 with a common relay or manual switch, there is little or no resultant force on the plunger 37. The current rise in each coil is, however, dependent upon the position of the armature 18. The rise of current is fastest in coil 203, slowest in coil 201 and about equal in coils 200 and 202. The lead of each coil is passed through similar toroidally wound current transformers 210 to generate an output signal of short duration and relative in time to the initial trigger impulse. The time interval of this output signal relative to the trigger is inversely proportional to the distance of the coil in question from the armature 18.

The output signals from the windings 210 pass through delay circuits 211 where the signals are suitably delayed. In the case in question they are so delayed that if they were applied to the excitrons of the coils from which they emanate, they trigger each of the excitrons in turn upon the arrival of the next half cycle of the alternating current. If these signals are applied to fire the coils from which they emanate, the armature 18 commences to move from the position shown towards the most remote coil 203 as the latter is triggered first. With the process continuing the armature 18 seeks the central position.

In the circuit arrangement shown the signal from the coil 200 is arranged to trigger either of the excitrons 207 or 205, that from coil 201 either of excitrons 204 or 206, from coil 202 either of excitrons 205 or 207 and from coil 203 either excitron 206 or 204. With the contact arms 212 in the position shown coil 200 excites excitron 207 and so on. This means that coil 200 is triggered first by the output signal derived from coil 203 and the armature 18 moves to the left. By reversing the arms 209 (e.g. by having them on a common manual switch or relay device) the armature 18 moves to the right.

Thus by operating the arms 209 the plunger 37 can be made to travel to the left or to the right. The same movements may be achieved by permanently exciting each excitron with the output signal from its coil and providing suitable adjustments on the timing circuits 211.

Movement in any one direction may be stopped by moving the arms 212 to a neutral position or by clamping the timing circuits 211. To start movements of the plunger 37 in any given direction from a state of rest, the switch controlling the arms 209 is set for the given direction, contacts 209 are closed to pass one trigger impulse and the plunger 37 thereafter commences to move in the required direction. Movement is arrested by moving the switch to the neutral position or by clamping the timing circuits.

During a period of rest and in between pulses the brake 204 clamps the plunger 37 in position. With pulses flowing the brake is released. It is possible to have a hydraulic braking system with the plunger working in two hydraulic cylinders with constricted by-pass between them. In the latter case provision has to be made for suitable gland structures.

It will be appreciated that the switch controlling the arms 212 may be regulated by a wide variety of means so that the direction of movement could be changed instantaneously responsive to various factors such as fluid pressures, temperatures and the like. When movement is to be reversed all that is required is a momentary arrest of motion, momentary closing of the contacts 209 and setting the arms 212 to a new position during the changeover.

Another useful application of a thrustor according to the invention is illustrated in Figure 11. Here two coils 11 and 12 surround a refractory pipe 215 conveying corrosive or radio-active materials. The armature 18 is formed as a reciprocating pump piston with a ball valve 216 in an enlargement 217 in an axial bore in the armature 18. A further ball 218 seats in a seating 219 provided in the pipe 215. The armature 18 is reciprocated by suitable pulses, e.g. in the manner described with reference to Figures 1 to 9, which energise the coils 11 and 12 in turn.

It should be noted that the balls 218, 216 and the seating 219 is made of suitable refractory material and that the armature 18 is clad in a similar material.

The kinetic properties of the thrustor may also be used for ejecting projectiles or otherwise accelerating bodies. This is diagrammatically illustrated in Figure 12. In this case the armature 18 is or forms part of a projectile or body which is arranged to move in a path defined by the cores of a series of coils 221, 222, 223, 224 and so on. Only the basic circuit arrangements are shown.

Again output impulses from each coil are utilised to fire three excitrons 225, 226 and 227. These are again derived from toroidal windings 210. Two coils are always energised at the same time. Assuming that coils 221 and 222 are energised, coil 221 is de-energised as soon as saturation is reached, e.g. by the arrangement shown in Figure 8. The output impulse from winding 210 associated with this coil is suitably delayed to trigger excitron 227 at this point to energise coil 223. By the same process when coil 222 is saturated, excitron 225 is fired. The latter has in the meantime been switched to energise coil 224.

In effect then each excitron energises a coil until saturation is reached. At this point another excitron is triggered to energise the next but one coil until it in turn is saturated. In the meantime the intermediate coil has reached saturation and causes still a further coil to be energised and so on.

Switching circuits 228 are arranged to switch the output from each excitron to a succeeding coil in its series while that excitron is not passing power pulses.

If in the arrangement of Figure 1, the armature 18 straddles the central pole piece 14 and current pulses of short duration are fed to the coils 11 and 12 alternately vibratory or short stroke reciprocating motion may be obtained.

Many arrangements are possible by altering the pulse sequences, duration of pulses, the number of coils and the ratings of the coils.

We claim:

1. An electromagnetic thrustor assembly including, a thrustor arm comprising a mass of magnetic material, a series of contiguous solenoids surrounding the path of the mass, the mass comprising a main portion of substantially uniform cross-sectional area and ends which are formed with conical indentations and the mass being of sufficient length so that by means of the continual increase of area after the poles of any one solenoid are bridged, the mass continues to have thrust in the direction of its leading end (relatively to the bridged solenoid) and while current is flowing in that solenoid, a grid biased current rectifier connected to each solenoid, means to lift the bias of the grids of the rectifiers simultaneously to supply current to all solenoids simultaneously, means to derive a grid-lifting signal from the current rise in each solenoid, means to delay the signals, and means to switch the signal from each solenoid in the middle of the series to the grid of the rectifier of either of its neighbors and of the end solenoids to its neighbour or the other end solenoid depending on the direction in which the arm is required to move.

2. The thrustor claimed in claim 1 including a toroidal winding around the input of each solenoid to derive the signal.

3. The thrustor claimed in claim 1 including means to clamp the arm when current is not flowing in the rectifiers.

4. The thrustor claimed in claim 3 in which the means is a series brake.

5. In combination a projectile projecting path, a series of contiguous solenoids surrounding the path, a projectile comprising a magnetic mass, which comprises a main portion of substantially uniform cross-sectional area and a leading end which is formed with a conical indentation and which is of sufficient length so that by means of the continual increase of area after the poles of any one solenoid are bridged, the mass continues to have thrust in the direction of its leading end and while current is flowing in that solenoid, three grid-biased rectifiers, means to switch each rectifier to different solenoids in the series, each rectifier being switched to every second alternative solenoid in the series, means to derive a grid-lifting signal from the current rise in each solenoid and means to apply the signal to that rectifier which is connected to the next but one solenoid in the series from the solenoid from which the signal is derived.

6. An electromagnetic thrustor assembly including a thrustor arm comprising a mass of magnetic material, a series of contiguous solenoids surrounding the path of the mass, the mass comprising a main portion of substantially uniform cross-sectional area and hollow tapered ends of sufficient length so that by means of the continual increase of cross-sectional area after any one solenoid is bridged, the mass continues to have thrust in the direction of its leading end and while current is flowing in that solenoid, grid biased power rectifying means, distribution means to connect each solenoid to the rectifying means, a pulse generating circuit for providing triggering pulses to lift the bias on the rectifying means, and a timing circuit arranged to gate triggering pulses to the rectifying means so that the latter produces direct current power pulses to energise the solenoids, the distributing means and the timing circuit being so arranged and the timing circuit being so set that direct current pulses flow to each solenoid in turn for a sufficient period of time to move the mass into the sphere of influence of the next solenoid.

7. The machine claimed in claim 6 including a coincidence differential circuit for each coil to shorten the pulses of the coils according to the back electro-motive force characteristics of the coil.

8. An electromagnetic thrustor assembly including a thrustor arm having a mass of magnetic material, two contiguous solenoids surrounding the path of the mass, the mass comprising a main portion of substantially uniform cross-sectional area and hollow tapered ends of sufficient length so that by means of the continual increase of cross-sectional area after any one solenoid is bridged, the mass continues to have thrust in the direction of its leading end and while current is flowing in that solenoid, a grid biased power rectifier in respect of each solenoid, means to connect each solenoid to its rectifier, a trigger generating circuit for providing triggering pulses to lift the bias on the rectifiers, a timing circuit to gate the triggering pulses and to switch on the required rectifier so that the latter produces direct current power pulses to energise the solenoids in turn for a sufficient period of time, the first solenoid being energised for a period sufficient to move the armature into the sphere of influence of the second solenoid, the second sufficient to complete the working stroke, to brake the armature and to return it into the sphere of influence of the first solenoid and finally the first for a sufficient period of time to return the armature to its starting position.

9. The apparatus claimed in claim 8 including two groups of grid biased power rectifiers connected to an alternating current supply, one group being arranged to be switched to the first solenoid and the other group to the second solenoid, and means to generate trigger pulses to lift the bias of the grids of the rectifiers in phase with the required current pulses.

10. The apparatus claimed in claim 9 including a pair of secondary grid biased rectifiers for supplying the trigger pulses to lift the bias of the grids of the rectifiers, means for generating incipient trigger pulses in phase with the alternating current supply of the power rectifiers, the incipient pulses being so phased that if they were of sufficient amplitude to allow the members of the rectifier pair to conduct, trigger pulses for each half cycle of the alternating current supply would be provided, but being of insufficient amplitude to lift the bias of the grids of the pair sufficiently for the pair to conduct, and means to generate gating pulses which added to the incipient trigger pulses allow the members of the pair to conduct and to provide a predetermined pattern and number of trigger pulses to the power rectifiers.

References Cited in the file of this patent

UNITED STATES PATENTS

| | | |
|---|---|---|
| 464,063 | Collom | Dec. 1, 1891 |
| 818,589 | Wegner | Apr. 24, 1906 |
| 991,384 | Stedman | May 2, 1911 |
| 1,241,333 | Bowman | Sept. 25, 1917 |
| 1,817,638 | Morris | Aug. 4, 1931 |
| 1,822,242 | Schongut | Sept. 8, 1931 |
| 2,235,201 | Cole | Mar. 18, 1941 |
| 2,483,895 | Fisher | Oct. 4, 1949 |
| 2,640,955 | Fisher | June 2, 1953 |
| 2,686,280 | Strong | Aug. 10, 1954 |
| 2,690,128 | Basilewsky | Sept. 28, 1954 |
| 2,892,140 | Praeg | June 23, 1959 |